United States Patent [19]  
Kasahara et al.

[11] 4,297,405  
[45] Oct. 27, 1981

[54] CORROSION RESISTANT METALLIC ARTICLE HAVING A MATT NACREOUS APPEARANCE

[75] Inventors: Nobuyoshi Kasahara, Sayama; Koutaro Nonomura, Kunitachi, both of Japan

[73] Assignee: Mitsui Mining & Smelting Co., Ltd., Tokyo, Japan

[21] Appl. No.: 1,347

[22] Filed: Jan. 5, 1979

[30] Foreign Application Priority Data

Jan. 9, 1978 [JP] Japan .................................. 53-537
Jan. 9, 1978 [JP] Japan .................................. 53-538
Jan. 9, 1978 [JP] Japan .................................. 53-539

[51] Int. Cl.$^3$ .......................... B32B 19/02; B05D 5/02
[52] U.S. Cl. .................................. 428/141; 148/6.16; 148/6.2; 427/262; 427/264; 428/324; 428/328
[58] Field of Search .................... 106/291, DIG. 3; 428/454, 324, 148, 469, 328, 141; 148/6.16, 6.2; 427/409, 410, 162, 262, 264

[56] References Cited

U.S. PATENT DOCUMENTS 3,087,828 4/1963 Linton ................................ 106/291
3,123,489 3/1964 Bolomey et al. .................... 106/291

OTHER PUBLICATIONS

Fushlock, D., *Metal Colouring*, Teddington, England, Robert Draper Ltd., 1962, pp. 14–15.

*Primary Examiner*—Evan K. Lawrence
*Attorney, Agent, or Firm*—Jordan and Hamburg

[57] ABSTRACT

A process for the production of a corrosion resistant metallic article having a matt nacreous appearance and the resultant article. The process comprises the steps of coating a metallic substrate with a clear paint comprising a curable resin vehicle and a flaky nacreous pigment having a colorless transparent appearance selected from oxides and salts of elements of Groups IV and V of the Periodic Table, to form on the metallic substrate a clear paint coating having a finely undulated surface in which the nacreous pigment is arranged in a non-laurellate fashion, and then curing the paint coating on the metallic substrate to produce the metallic article. The metallic substrate is preferably zinc or zonc alloy which is chemically treated to form a colorless, transparent corrosion-resistant film thereon prior to coating with the clear paint.

9 Claims, No Drawings

CORROSION RESISTANT METALLIC ARTICLE HAVING A MATT NACREOUS APPEARANCE

BACKGROUND OF THE INVENTION

This invention relates to a process for the production of a metallic article having a matt nacreous appearance in which the metallic substrate is a white-silvery metal such as zinc, aluminum, magnesium, iron or an alloy thereof and also relates to the metallic article produced thereby.

Heretofore, conventional metallic articles having a matt nacreous appearance were produced by a satin nickel and chromium plating process (for example, a satin nickel plating process by Udylite Corp.) comprising preparing a nickel plating bath in which are suspended non-conductive fine particules such as barium salt particles and then simultaneously electrodepositing the nickel and barium salt particles, or by a process using a synthetic resin coating material prepared by kneading aluminum fine particles therewith. Such conventional metallic articles which are metallized products are widely used for the purpose of decorating automobile and architectural hardware and daily necessaries as well as of anti-glaring effect.

However, the aforesaid satin plating process requires, as a matter of course, a plating apparatus including a power source and is disadvantageous in that sewage from the apparatus must be treated under the strict regulations for prevention of environmental pollution and, further, there are many limitations on the sewage treatment. In addition, when said process is attempted to be used in plating on a zinc-based alloy, it requires three steps of copper plating, nickel plating and chromium plating thereby rendering the process operationally complicated with an attendant high operational cost.

On the other hand, the metallic paint coating process is operationally simple; however, the metallic coatings obtained thereby appear less transparent and have less decorative effects than those obtained by the satin nickel plating process since they relay for their matt nacreous appearance on the aluminum powder contained in the coating formed thereon and, further, they are very often unsatisfactory in corrosion resistance and adhesion of the coating to the substrate whereby they tend to be remarkably degraded in appearance. In addition, an electrostatic coating process usable for mass production of coated products is difficult to apply to said metallic coating since the aluminum powder contained in the layer formed by the said coating is electrically conductive.

Various studies were made by the present inventors in attempts to find a new process for the economical production of excellent anti-corrosive metallic articles in which a clear paint coating is securely bonded to the metal substrate, with the result that there was developed such a new process which was advantageous over the conventional processes. This invention is based on this finding or discovery. According to this invention, there may be obtained metallic articles having a high-class decorative matt nacreous appearance which is apparently more attractive than metallic coated articles. In addition, such metallic articles are more excellent in corrosion resistance than satin nickel plated articles and are also excellent in adhesion of coating with elimination of conventional unsatisfactory adhesion thereof.

SUMMARY OF THE INVENTION

An object of the present invention is to provide a process for the production of metallic articles having a matt nacreous appearance which is at least equal in attractiveness and profoundness to that of the satin nickel plated articles, the process eliminating the aforesaid disadvantages of the conventional coating processes and using more economical techniques.

Another object is to provide the metallic articles produced by the process of the present invention.

A further object is to provide a process for the production of metallic articles having a matt nacreous appearance and corrosion resistance.

A still further object is to provide the metallic articles additionally having better corrosion resistance.

These and other objects will be fully understood from the following description.

The crux of the present invention resides in the fact that in the formation of a transparent synthetic resin coating (or film) containing fine nacreous (or pearl) pigments on a white-silvery metal substrate, the coated metal substrate will have a matt nacreous appearance in cases where the coating is formed so that the fine nacreous pigments are dispersed in the coating in a non-lamellate arrangement, thereby forming micro-irregularities or fine undulations on the coating surface.

DETAILED DESCRIPTION

The metal substrates which may be used in this invention include zinc die castings, superplastic zinc alloys, zinc alloy castings, zinc plates and moldings thereof, aluminum-containing zinc-based alloys, aluminum or magnesium and other die castings, aluminum or magnesium alloys, and other substrates (to be described later) which are chemically treated for increasing their corrosion resistance.

In the process of this invention, a metallic substrate made typically of zinc, aluminum, magnesium or an alloy thereof as a white-silvery metal, is subjected to chemical treatment to form a colorless transparent or substantially colorless transparent corrosion-resistant coating or film on the surface of the metallic substrate. Then, a clear or transparent synthetic resin coating material containing a nacreous pigment in fine flaky form selected from the group consisting of (1) oxides and salts of elements of Groups IV and V of the Periodic Table and (2) composites composed of mica or the like and said compounds (1) precipitated thereon, is applied (by spraying, for example) to the corrosion-resistant coating at a feeding rate lower than that necessary for arranging the flaky pigment in substantially lamellate form and a spraying air pressure higher than that necessary therefor, thereby to form on the corrosion-resistant coating a nacreous pigment-containing synthetic resin coating having finely undulated surface due to at least partly to the non-lamellate arrangement of the nacreous pigment, resulting In the production of a metallic article having a matt nacreous appearance and improved corrosion resistance. Alternatively the flaky nacreous pigment-containing synthetic resin coating having the finely irregular (matt) surface may be formed on a flaky nacreous pigment-containing synthetic resin coating having the flaky nacreous pigment arranged in substantially lamellate form, the latter resin coating having previously been formed on the chemically formed corrosion-resistant coating.

It is necessary that the metallic substrates used in this invention should have a clean appearance without dirt and stains on the surface thereof since the surface condition of the metallic substrates will have direct effects on the appearance of the resulting clean paint-coated metallic substrates. It is preferable that die castings or the like be free of surface irregularities and the metallic substrates be subjected to buff polish followed by being degreased with trichloroethylene if necessary.

The chemically formed coatings preferably used in this invention are colorless or substantially colorless, corrosion resistant and satisfactorily receptive for paints or coating materials. The metallic substrates may be subjected to treatments with a chromate, a phosphate, tannic acid or other anti-corrosive agents thereby to chemically form a corrosion-resistant film on the substrates. More particularly, in order to form such a film, the metallic substrates may be immersed in a highly alkaline solution containing copper ion to substitution deposit a minute amount of copper on the substrates and then treated with a colorless transparent solution of chromic acid containing $CrO_3$, $F^-$, $PO_4^{3-}$ and the like as the main components as disclosed in Japanese Patent Gazette No. 40534/76, they may be subjected to a known colored chromic acid treatment for zinc and then immersed in a dilute alkali solution for decoloration (this method being known as a "UNICHROME method") or they may be treated with an alkaline chromate solution prepared by adding an alkali additive such as sodium hydroxide, to an alkali bichromate (Japanese Patent Gazette No. 22336/77).

Japanese Patent Application Laying-Open Gazette No. 116128/76 discloses, as a process for the chemical treatment of zinc die casts, a process which comprises treating zinc die casts with an alkaline chromium solution containing 0.1–5 mol/l of a caustic alkali and 2–50 g/l of hexavalent chromium ion, the ratio being 0.05–0.3 mol/g between the caustic alkali concentration (mol/l) and the hexavalent chromium ion concentration (g/l) thereby to obtain a chemically treated zinc die castings which preferably retain their original metallic luster.

In addition, Japanese Patent Application Laying-Open Gazette No. 71840/76 discloses a process comprising immersing zinc or a zinc alloy in an acidic solution containing phosphoric acid or a salt thereof, thereafter immersing the thus treated metal in a highly alkaline solution containing hexavalent chromium and then immersing the thus further treated metal in an acidic solution containing hexavalent chromium thereby to form on the metal a chemically produced film which has corrosion resistance and paint receptivity, only slightly greys the surface of the metal but does not color the surface without remarkable etching of the metal substrate; thus, the chemically produced film is useful as an undercoat for a clear paint containing nacreous pigments.

Further, Japanese Patent Gazette No. 22336/77 discloses a process for forming on zinc or zinc alloys a colorless transparent corrosion-resistant chromium-zinc compound film having excellent paint receptivity which comprises immersing zinc or a zinc alloy in a highly alkaline solution containing at least 5 g/l of hexavalent chromium without a complexing agent for the chromium and then immersing the thus treated metal in an acidic solution containing hexavalent chromium to form the chromium-zinc compound film. This disclosed process is also a preferable one for the formation of a chemically produced film suitable for the purpose for the present invention.

It is required that the thus chemically treated metal substrates be substantially the same in color and appearance as the original metal substrates. The thus treated metal substrates are allowed to stand for drying or dried by hot air and then coated with a paint.

The resins used as vehicles may be thermoplastic or thermosetting.

The clear paints used herein include those containing a conventionally used resin such as a melamine resin, acrylic resin, an unsaturated thermoplastic polyester resin or an ultraviolet light curable resin, as well as an inorganic nacreous pigment, the resin and the pigment being used in any mixing ratios.

The inorganic nacreous or pearl pigments used herein preferably include oxides and salts of elements of Groups IV and V of the Periodic Table. The reason for this is that the compounds of these elements are mostly colorless and have a high refractive index ($n_D > 1.8$) and, therefore, they meet the requirements for producing nacreous luster. Among these compounds, oxides and salts of titanium, zirconium, tin and bismuth are practically valuable from the industrial point of view. Basic lead carbonate which is a lead compound, tends not to be used from the view-point of environmental pollution. Said compounds usable as nacreous pigments may be used in coating mica flakes to form composite nacreous pigments. Mica flakes, per se, are not suitable as nacreous pigments. The composite nacreous pigments include those prepared by precipitating on mica flakes titanium oxide, zinc sulphide, tin oxide, zirconium oxide or the like having a high refractive index, fire resistance, chemical resistance and weatherproofing property.

These nacreous pigments may generally be obtained in the form of white-silvery fine flakes having a high refractive index and an average diameter of 5–100μ and, further, they are compatible with a clear coating material and little coagulative therein. More particularly, the nacreous pigments are required to have a colorless transparent appearance, a refractive index ($N_D$) of at least 1.8 and a particle size of 5–100μ. They are also required to be in scaly or flaky particulate form, with the particles having such a size that the ratio of the thickness to surface area being in the range of from about 1:200 to 1:25. If the pigments have too large a particule size then they will give a "rough" appearance, while if they have too small a particle size then they will have a "flat" appearance. In addition, they are required to be well dispersible in organic coating materials. It has also been found that clear paints containing the nacreous pigment may be more conveniently handled and more excellently preservable than aluminum powder-containing paints for metallic coating. Such nacreous pigments may generally be added to a clear coating material (having been incorporated with a thinner to adapt the coating material to be coated by spraying) in an amount of 10–100 g of pigment/l of coating material, and the whole is agitated or mixed together thereby to obtain a desired paint for providing nacreous appearance.

In order to obtain a metallic article having corrosion-resistant matt nacreous appearance, the paint is required to be coated on a substrate so that the nacreous pigment flakes in the paint are arranged at random thereby to obtain the metallic article having thereon a coat with an irregular or undulated surface, the light incident upon the flakes composing the irregularities of the surface being reflected in various directions thereby to decrease the reflected light intensity or amount. Such a coat having an irregular surface may be formed on a coating prepared by coating the paint on a substrate so that the nacreous pigment flakes are arranged in substantially parallel with the surface of the substrate thereby to form a lamellar structure of the flakes. In these cases, the metallic article so obtained is required to have a light reflectivity of about 30–60%, with a light reflectivity of less than 30% giving gray appearance and that of more than 60% decreasing anti-glaring effects.

In order to obtain the aforesaid matt coating, the paint is atomized or sprayed onto the substrate or undercoat at a feeding rate lower than a usual one and at a spraying air pressure generally higher than a usual one, thereby to form thereon paint particles (composed of nacreous pigment and vehicle) which are then cured. Alternatively, the paint is coated on a metallic substrate to form a surface-smoothed coating having a semi-bright nacreous appearance and such a coating having a finely irregular (or undulated) surface and matt appearance may be formed on the said surface-smoothed coating, this being a two-step coating formation method. As to the said feeding rate and spraying air pressure, examples of the usual feeding rate (for forming smooth surfaces) are in the range of 50–300 c.c./min. and the higher feeding rate (for forming irregular surfaces) is $\frac{1}{2}$–1/30, preferably 1/5–1/30, of the usual one; the spraying air pressure (for forming smooth surfaces) is 1–4 $Kg/cm^2$, preferably 1–3 $Kg/cm^2$, when a hand spray gun is used and 1–2 $Kg/cm^2$ when a hand electrostatic gun is used, while the higher spraying air pressure (for forming irregular surfaces) is essentially at least 3 $Kg/cm^2$ when a hand spray gun is used and essentially at least 3 $Kg/cm^2$ when a hand eletrostatic gun is used.

If in order to form an irregular paint coating, there is used the clear paint containing a thinner having a lower boiling point which will evaporate in a shorter time during spray coating, then the said higher feeding rate may be $\frac{1}{2}$–1/20 of the said usual one while the spraying pressure may be the same as the usual one.

The metallic articles obtained by these methods have more attractive refined decorative appearance than satin nickel plated articles (matt finish) although the former are similar to the latter in some respects.

The nacreous pigments have a weak hiding power as compared with aluminum powder. However, the metallic articles having a chemically produced colorless film (hereinafter sometimes referred to as "undercoat") primer coat according to this invention exhibit satisfactory decorative and corrosion-resistant effects owing to the undercoat even if the nacreous pigment-containing paint coating (hereinafter sometimes referred to as "overcoat") formed thereon has a thickness of as small as about 2$\mu$. The best results are obtained with paint coatings having a thickness of 5–50$\mu$. Repeatedly stated, the previous formation of the chemically produced undercoat on the metallic substrate will make it possible to coat the clear paint in a less thickness and dispense with many-time repeated spraying of the paint for the purpose of obtaining metallic articles having corrosion resistance and nacreous luster, this being very advantageous in that the amount of the paint required is saved and a decrease in cost is attained.

Particularly, the metallic articles having the chemically produced undercoat are remarkably corrosion-resistant, and their corrosion resistance is equal to, or more excellent than, that of satin nickel plated articles since the metallic substrate will tend not to be corroded on the surface if moisture or the like enter through the pin holes, if any, of the overcoat to the metallic substrate.

According to the salt spray test prescribed in JIS (Japanese Industrial Standard) Z 2371, the metallic articles having the corrosion-resistant undercoat will not corrode when exposed to salt spray for at least 72 hours and, further, those having the corrosion-resistant undercoat on the previously illustrated zinc or zinc alloy will retain their matt nacreous appearance for at least 300 hours but those having not such an undercoat will rust about 50 hours later from the time when they are exposed to salt spray.

The chemically produced film (undercoat) serves to greatly improve the adhesion of the nacreous pigment-containing paint coating (overcoat) to the metallic substrate. This is substantiated by the fact that these overcoat and undercoat will not peel off the metallic substrate (100/100:100 of 100 cross-hatch tape portions left non-peeled) when they are subjected to a cross-hatch tape test which is a known paint adhesion test, while such an overcoat directly formed on the metallic substrate (without such an undercoat) will be somewhat (10–30% or 70–90/100) peeled off the substrate. This shows great effects obtainable by the formation of the undercoat.

The metallic articles of this invention may be obtained at a low cost by the use of an environmental pollution-sparing process as compared with the conventional matt semi-bright plated metallic articles.

The metallic articles of this invention have excellent appearance as compared with those obtained by coating a metallic paint on a substrate with aluminum powder and, further, they may be used as metallic parts for machines, apparatuses, automobiles, architecture and daily decorations thereby to provide these objects with high-class attractive appearance.

This invention will be better understood by the following non-limitative examples.

EXAMPLE 1

A zinc die cast (about 96% Zn, 4% Al, 0.03% Mg) was immersed at 30° C. for 30 seconds in an aqueous solution containing 10 g/l of lithium hydroxide and 0.1 g/l of copper sulphate and then immersed at 40° C. for 10 seconds in a chromic acid treating liquid containing 20 g/l of chromic acid anhydride, 10 g/l of potassium fluoride and 10 g/l of sodium phosphate thereby to form a colorless bright film on the zinc die cast in accordance with the process of Example 2 of Japanese Patent Gazette No. 40534/76. On the other hand, a clear paint was prepared by incorporating a heat curable melamine resin coating material (obtained by diluting a melamine resin with a thinner) with 50 g/l of a nacreous pigment composed mainly of bismuth oxychloride and then thoroughly mixing the resin coating material and the pigment together. The aforesaid film-covered zinc die cast was coated in a thickness of about 20$\mu$ with the thus prepared clear paint at a usual feeding pressure of 2.5 $Kg/cm^2$ by the use of a hand spray gun (produced under the trademark of WIDER-51 Model by Iwata Coater Co.), baked at 140° C. for 30 minutes to be cured, thereafter further coated in a thickness of about 2$\mu$ with the same clear pigment atomized at an increased feeding pressure of 5.0 $Kg/cm^2$ and a decreased feeding rate and then baked, thereby to obtain a metallic article of this invention having a light reflectivity of 50% and approximately the same appearance as matt satin nickel plated articles.

EXAMPLE 2

A zinc die casting alloy (produced under the trademark of ZAC No. 1 by Mitsui Smelting and Mining Co., Ltd.) as cast (coaster) was immersed in a liquid containing 110 g/l of sodium hydroxide and 25 g/l of sodium bichromate at 50° C. for 2 minutes in accordance with the process of Example 1 of Japanese Patent Application Laying-Open Gazette No. 11628/76, washed with water, dried, spray coated in a thickness of about 10μ with a clear paint at a spraying air pressure of 5.0 Kg/cm$^2$ and a reduced feeding rate and then baked for curing thereby to obtain a metallic article.

The metallic article so obtained had a light reflectivity of 52% and uniform matt nacreous metallic appearance which was attractive and profound but similar to satin nickel plated articles.

EXAMPLE 3

A commercially available non-spangled galvanized sheet was degreased, immersed in a firstly treating liquid containing 5 g/l of phosphoric acid and the balance water at 40° C. for 5 seconds, washed with water, immersed in a secondly treating liquid containing 100 g/l of potassium bichromate, 50 g/l of sodium hydroxide and the balance water at 40° C. for 10 seconds, washed with water, immersed in a thirdly treating liquid containing 10 g/l of chromic acid anhydride and the balance water at 20° C. for 10 seconds, washed with water and dried in accordance with the process of Example 2 of Japanese Patent Application Laying-Open Gazette No. 71840/76.

The galvanized sheet so treated was spray coated and then baked for curing in quite the same manner as in Example 8, thereby to obtain a metallic article.

The metallic article so obtained had a light reflectivity of 48% and attractive matt nacreous appearance which was similar to that of satin nickel plated articles.

Comparative example 1

The same zinc die cast as used in Example 1 was subjected to matt satin nickel plating which comprised the successive three steps of Cu-plating, Ni-plating and Cr-plating. The plate formed on the zinc die cast was about 20μ in thickness.

Then, the metallic articles as obtained in Examples 1–3 and Comparative example 1 were subjected to a salt spray test and a film adhesion test (cross-hatch cellophane tape peel test), with the results being shown in the following Table 1.

TABLE 1

| | Salt spray test | Cross-hatch tape peel test |
|---|---|---|
| Example 1 | Rust found 300 hours after start of test | Not peeled |
| Example 2 | Rust found 480 hours after start of test | " |
| Example 3 | Rust found 480 hours after start of test | " |
| Comparative example 10 | Rust found 240–300 hours after start of test | — |

EXAMPLE 4

A superplastic zinc alloy (78% Zn, 22% Al) was immersed in a treating liquid containing 60 g/l of sodium bichromate and 100 g/l of sodium hydroxide at 60° C. for 2 minutes and further immersed in a solution containing 1 g/l of chromic acid and 1 g/l of conc. hydrochloric acid at 30° C. for 10 seconds to form a colorless chromic acid film on the die cast in accordance with the process disclosed by Japanese Patent Gazette No. 22336/77, and the film-covered alloy was dried in air. On the other hand, a clear paint was prepared by incorporating a thermoplastic acryl resin coating material (obtained by the dilution of an acryl resin paint with a thinner in the same amount by volume as the resin) with 30 g/l of a nacreous pigment (obtained by the precipitation of titanium dioxide on mica flakes and then thoroughly mixing the resin coating material and the pigment together. The aforesaid film-covered zinc die cast was spray coated in a thickness of 15μ with the thus prepared clear paint by the use of a REA hand gun (electrostatic spray gun, produced by Ransberg Co.) at a reduced feeding rate and an increased spraying air pressure of 5.0 Kg/cm$^2$ (a usual feeding pressure being about 2.0 Kg/cm$^2$) to atomize the paint. The thus spray-coated zinc die cast was dried and cured at ambient temperature thereby to obtain a metallic article. The metallic article so obtained had a light reflectivity of 48% and an appearance somewhat similar to that of satin nickel plated articles, however, the former appearance was a more attractive matt nacreous one than the latter.

The metallic article so obtained was tested for corrosion resistance and paint coating adhesion, with satisfactory results being obtained.

In a particular case where such a superplastic zinc is used as the metallic substrate, it is difficult to form a satisfactory film secured to the substrate by the use of a usual plating method comprising the three successive steps of copper plating, nickel plating and chromium plating since the substrate has an aluminum content of as high as 22% by weight. However, this invention eliminates the aforesaid drawback and, therefore, it would also be highly evaluated in this regard.

In this invention, the nacreous pigment may comprise, by weight (1) 10 parts of the oxides or salts of elements of Groups IV and V of the Periodic Table and (2) 5–50 parts of mica or the like, the compound (1) being preferably precipitated on the compound (2). The nacreous pigment may be used in an amount of 10–100 g, preferably 20–70 g, per kilogram of the clear resin (containing no thinner).

What is claimed is:

1. A process for the production of a metallic article having a matt nacreous appearance and improved corrosion resistance, comprising the steps of:
    subjecting to chemical treatment a metallic substrate made of a metal selected from the group consisting of zinc, aluminum, magnesium and alloys thereof as white-silvery metals to form a substantially colorless transparent film having improved corrosion resistance on the surface of the metallic substrate,
    coating the corrosion resistant film-covered metallic substrate with a clear paint comprising a nacreous pigment in fine flaky form having a colorless and transparent appearance by spraying the paint to the corrosion resistant film at a lower feeding rate than that necessary for arranging the flaky pigment in substantially lamellate form and a spraying air pressure generally higher than that necessary therefor, the nacreous pigment being a nacreous compound selected from the group consisting of (1) oxides and salts of elements of Groups IV and V of the Periodic Table and (2) composite composed of mica and said nacreous compound coated thereon, to form a coating having a finely undulated surface on said corrosion resistant film and then drying the thus formed clear paint coating having the finely undulated surface on the film-covered metallic substrate to produce the metallic article.

2. A process for the production of a metallic article having a matt nacreous appearance and improved corrosion resistance, comprising the steps of:

subjecting to chemical treatment a metallic substrate made of a metal selected from the group consisting of zinc, aluminum, magnesium and alloys thereof as white-silvery metals to form a substantially colorless transparent film having improved corrosion resistance on the metallic substrate, coating the corrosion resistant film-covered metallic substrate with a clear paint comprising a nacreous pigment in fine flaky form having a colorless and transparent appearance the nacreous pigment being a nacreous compound selected from the group consisting of (1) oxides and salts of elements of Groups IV and V of the Periodic Table and (2) composites composed of mica and the nacreous compound coated thereon, to form on the metallic substrate a smooth, clear paint coating in which the flaky nacreous pigment is arranged in substantially lamellar form, drying the paint coating so formed on the film-covered metallic substrate and then further coating the thus cured clear paint coating with the same clear paint as defined above by spraying the paint to said clear paint coating at a lower feeding rate than that necessary for arranging the nacreous pigment in substantially lamellar form and a spraying air pressure generally higher than that necessary therefor to form a paint coating having a finely undulated surface on the said cured clear paint coating and then drying the thus formed coating having the finely undulated surface to produce the metallic article.

3. A process according to claim 1 or 2, wherein the coating of the clear painting is effected at a feeding rate of ½-1/30 of the one for forming the coating having the pigment in substantially lamellate form and the spraying air pressure is at least 3 Kg/cm$^2$ by the use of a hand spray gun or a hand electrostatic gun.

4. A process according to claim 1 or 2, wherein the chemical treatment is effected on zinc or a zinc alloy in an alkaline solution comprising 0.1-5 mol/l of an alkali metal hydroxide and 2-50 g/l of hexavalent chromium ion, the ratio of concentration of the alkali metal hydroxide to the hexavalent chromium ion is in the range of 0.05-0.3 mol/g.

5. A process according to claim 1 or 2, wherein the chemical treatment is effected on zinc or a zinc alloy firstly in an acidic solution containing phosphoric acid or a salt thereof, secondly in a highly alkaline solution containing hexavalent chromium and lastly in an acidic solution containing hexavalent chromium.

6. A process according to claim 1 or 2, wherein the chemical treatment is effected in a highly alkaline solution containing copper ion to deposit therefrom a minute amount of copper on the surface of the metallic substrate and then in a colorless transparent chromic acid solution comprising $CrO_3$, $F^-$ and $PO_4^{3-}$ as the principal components.

7. A process according to claim 1 or 2, wherein the chemical treatment is effected on zinc or a zinc alloy in a highly alkaline solution containing at least 5 g/l of hexavalent chromium without any complexing agent therefor and then in an acid solution containing hexavalent chromium.

8. A metallic article produced by the process of any one of claims 1 or 2.

9. A metallic article having a light reflectivity of 30-60% produced by the process of claim 1 or 2.

* * * * *